United States Patent [19]

Eaton

[11] Patent Number: 4,628,868
[45] Date of Patent: Dec. 16, 1986

[54] NON-PLUGGING AIR DISTRIBUTION SYSTEM FOR SPENT BED COOLER

[75] Inventor: Robert L. Eaton, Ashland, Ky.

[73] Assignee: Ashland Oil, Inc., Ashland, Ky.

[21] Appl. No.: 699,716

[22] Filed: Feb. 8, 1985

[51] Int. Cl.[4] .................................. F22B 1/00
[52] U.S. Cl. ........................ 122/4 D; 34/57 A; 110/245; 165/104.16; 431/170
[58] Field of Search ............ 431/7, 170; 122/4 D; 110/245; 165/104.16; 34/57 A

[56] References Cited

U.S. PATENT DOCUMENTS 3,633,887 1/1972 Bechthold et al. ............ 431/170 X
4,148,437 4/1975 Barker et al. .................. 431/170 X
4,387,667 6/1983 Goodstine et al. ................ 122/4 D Primary Examiner—Edward G. Favors
Attorney, Agent, or Firm—Richard C. Willson, Jr.; Stanley M. Welsh; C. William Crady

[57] ABSTRACT

Apparatus is described for a non-plugging gas distribution system supplying fluidizing gas to a fluid bed undergoing cooling.

12 Claims, 6 Drawing Figures

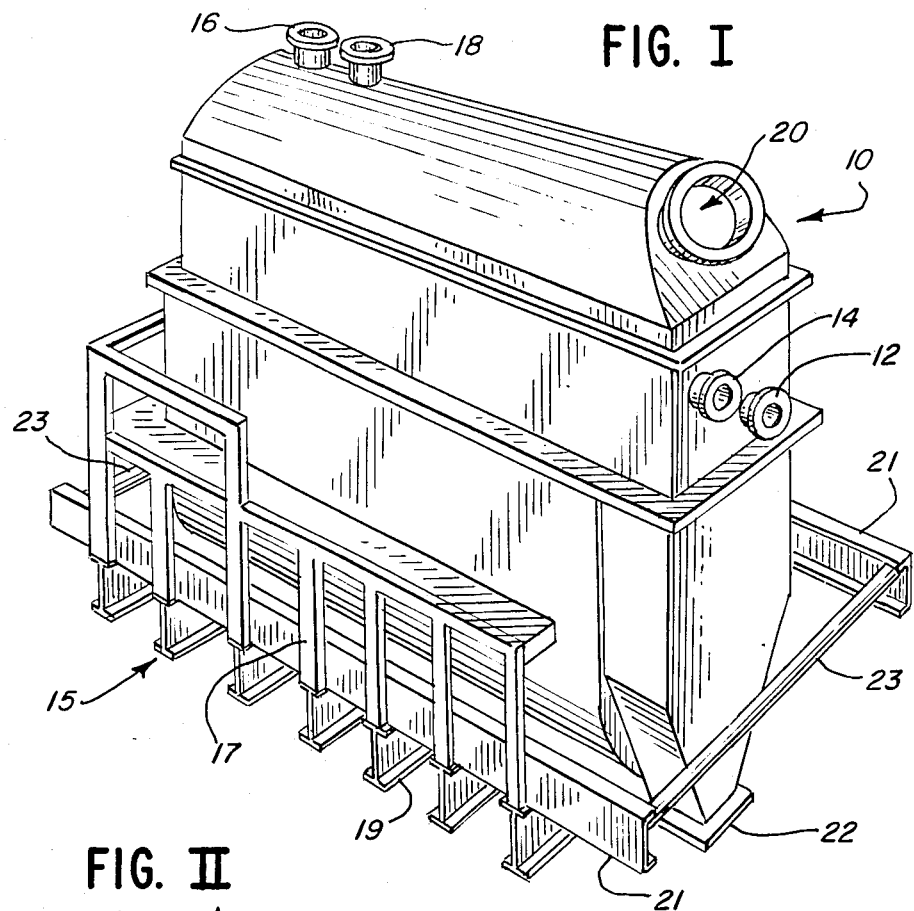
FIG. I
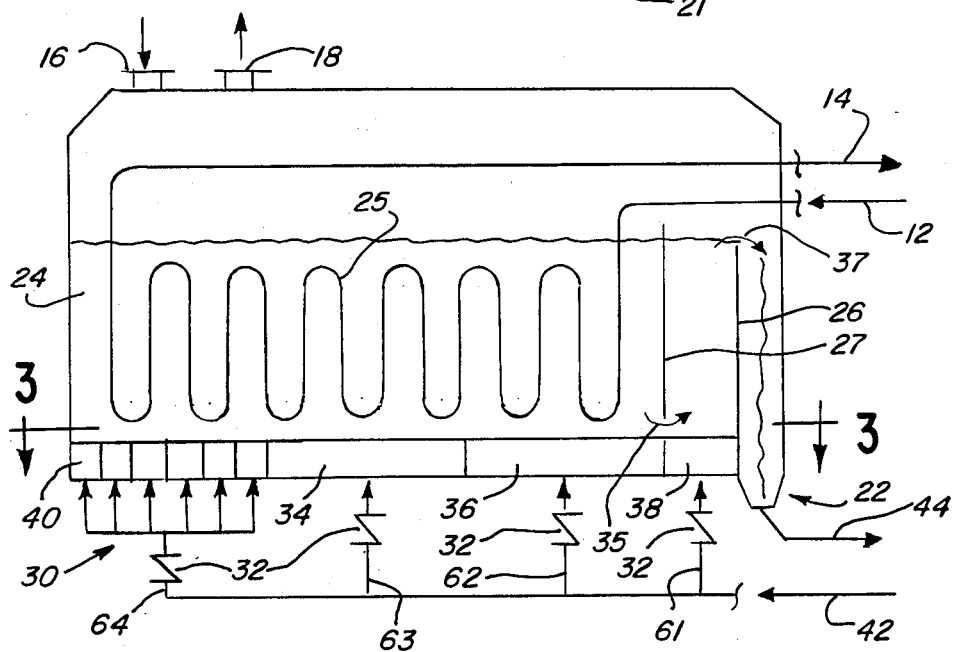
FIG. II

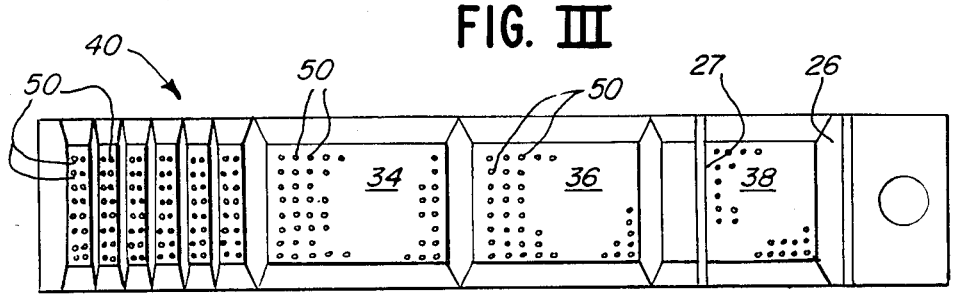
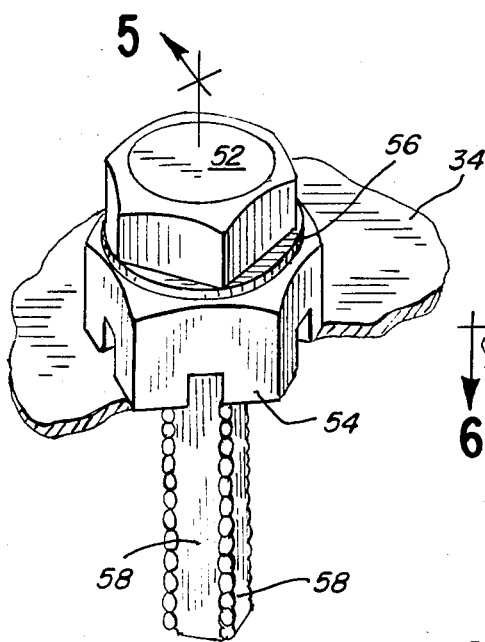
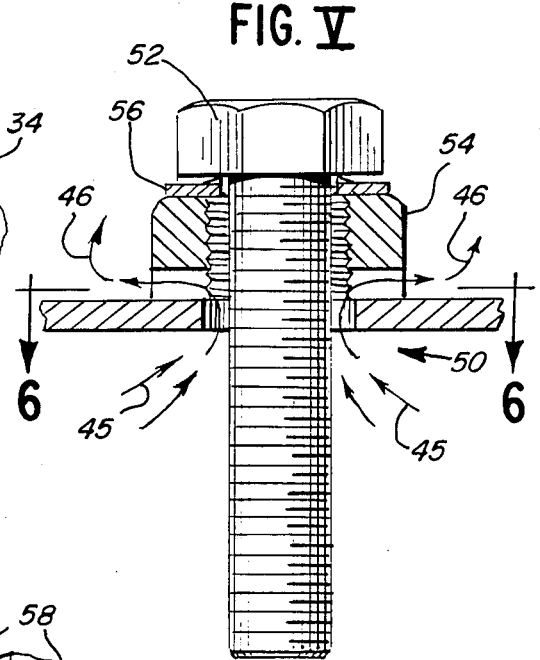
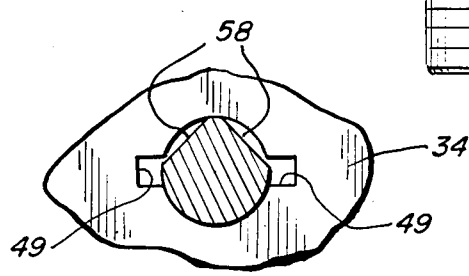

NON-PLUGGING AIR DISTRIBUTION SYSTEM FOR SPENT BED COOLER

BACKGROUND OF THE INVENTION (I) Field of the Invention

This invention relates to a gas distribution system which employs either header boxes or manifold systems having holes.

(II) Prior Art

In CO boilers (carbon monoxide boilers) employing fluidized limestone to capture sulfur oxides, there is a need to remove spent limestone which has become sulfated. Since the sulfated limestone, when it leaves a CO boiler, often reaches temperatures as high as 1500° F., it is necessary to cool such fluidized limestone to temperatures on the order of 350° F. so that the cooled solids may be transported and handled by conventional conveyor systems, such as sold by Dynamic Air, St. Paul, Minn. An example of a limestone fluid bed boiler known in the art would be one sold by Foster-Wheeler Corporation, Livingston, N.J. An example of a waste bed cooler to reduce the temperature of spent limestone (calcium oxide, managenese oxide, and other materials that are employed in such CO boilers) is one sold by Procedyne Corp., Box 1286, New Brunswick, N.J. The CO boiler, the conveyor and the waste bed cooler per se are not a part of this invention.

One problem of commercially available waste bed coolers for solids is that the air distribution system employed to maintain a fluidized bed of solid particles therein over a period of time tends to become plugged. Efforts to lessen or avoid such plugging, which were tried unsuccessfully, included: filtering the air used in the distribution system; shaving one or more portions of bolts that are inserted through air distribution holes (to be discussed in more detail hereinafter); and varying the air distribution rate to different sections of the fluidized bed; and supplementing the fluidizing medium through distribution pipes so as to permit a lessening of the overall flow rate through the distribution plate holes. While all of these methods to some degree lessened the frequency of plugging, they failed to eliminate it for more than about three months at a time.

SUMMARY OF THE INVENTION

The improved gas distribution system of the present invention provides novel means for imposing a horizontal flow path upon fluidizing gas passing through holes in a plate, said means comprising nuts or spacers having openings which stimulate horizontal flow and prevent plugging.

The spent limestone particles to be cooled have an average overall particle diameter in equivalent spherical dimensions in the range of about 500 to about 1,500 microns. The specific gravity of the particles is in the range of about 2 to about 4, and preferably in the range of about 2 to about 3. The pressure drop across the fluidized bed is in the range of about 30 to about 60 inches of a water column. The air grid pressure drop was in the range of from about 15 to about 40 inches of a column of water. (The maximum differential pressure for the system across the air distribution system from within the distribution boxes to the fluidized bed is about 40 inches of a column of water and the minimum is about 15 inches of a column of water.) The maximum pressure differential of 40 inches is determined by commercial blowers or systems for pressuring vapors that are commonly used in a refinery. However, larger pressure differentials can be used but do not lead to any significant improvement in performance and might even be deleterious if the pressure drop leads to channeling or loss of fluidized bed material through the air removal system. The minimum differential pressure of about 15 inches is determined by the minimum amount of pressure necessary to maintain equal distribution of the cooling air. The pressure drop across the bed about 30 to 40 inches, is the minimum to maintain a fluidized bed.

In view of the plugging difficulty associated with gas manifolds employing holes through plates, it is an object of this invention to substantially lessen and avoid such plugging problems and consequent excessive pressure drop. The distribution system of this invention comprises an assembly of hardware elements which coact to provide a uniform flow of gas to and through a fluidized bed of solids.

BRIEF DESCRIPTION OF THE DRAWINGS

FIG. I is a perspective view of a spent bed cooler.

FIG. II is a side elevation schematic view of FIG. I in cross-section.

FIG. III is a top planar view looking down on the air distribution system of FIG. II along line 3—3.

FIG. IV is a perspective view of a bolt, lock washer and castle nut in a notched hole.

FIG. V is a cross-sectional side elevation view of FIG. IV along line 5—5 of FIG. IV.

FIG. VI is a top plan view of plate 34 shown in FIG. V without bolt 52 and associated hardware.

DETAILED DESCRIPTION OF THE INVENTION

Referring to FIG. 1, there is disclosed a perspective view of a spent bed cooler. As it is used in this specification the term spent bed cooler means a device for cooling spent solids from their reaction temperature to a temperature suitable for handling, transportation and disposal. In spent bed cooler 10, there is a cooling water inlet 12, a cooling water outlet 14, a hot solids inlet 16, a cooled solids outlet 22, an exhaust gas (e.g. air) outlet 18, a man-way entrance 20, and a support frame 15, consisting of beams 17 and "I" beams 19. "U" shaped beams 21 along each side with tying beams 23 front and back. Support frame 15 provides support to the walls of cooler 10, which walls under the load and pressure of fluidized bed 24 (shown in FIG. 11), tend to bulge outward.

FIG. II discloses a side elevation schematic view of FIG. I. Arrows indicate the direction of material flow. Disclosed in FIG. II is heat exchange coil 25, an air distribution system 30, comprising gas distribution boxes 34, 36, 38 and 40. In this embodiment box 40 is divided into six box units each with its own air supply. This arrangement allows for thermal expansion.

Briefly, the operation of a spent bed cooler 10 is given hereinafter. Spent hot solids from a fluidized boiler are introduced through inlet 16 and dropped into fluidized bed 24. Fluidized bed 24 contacts heat exchanger 25 and spent solids are thereby cooled as they move through cooler 10 in the direction of arrows 35 and 37. Flow weir 26 determines the overall height of fluidized bed 24, and flow weir 27 promotes mixing of the material before exiting the cooler. Solid particulates are removed through outlet 22 into conduit 44 from cooler 10. Water is introduced into inlet 12 and removed through outlet 14. Exhaust air is removed through outlet 18. Man way 20 permits the possibility for a person to enter the interior of cooler 10 for maintenance and inspection.

Referring to FIG. III, the air distribution system is shown in a top plan view. Air distribution subsystem 40 comprises six small air supply boxes 6 inches wide and about 26½ inches long. The distribution holes through the small boxes are such that there are 35 holes per row and nine rows per each box. Air distribution box 34 is 44⅝ inches wide and 26½ inches long having 71 rows of holes wherein there are 40 holes per row (a total of 3,160 holes). Distribution box 36 is 41¼ inches wide and 26¼ inches long, and has 2,800 holes in 64 rows of 40 holes per row. Distribution box 38 has 2,273 holes in 54 rows of 40 holes per row and is 33 inches wide and 26¼ inches long.

Referring again to FIG. II, into each air distribution box are a set of supply pipes which are fed from conduit 42. These pipes each have independently controllable valves 32 which control the flow rate of air into each air distribution box of the system. Preferably, through conduit 42, fluidizing air at a rate of about 20,000 to 25,000 lbs/hour of air or 4,400 to 5,500 scfm (standard cubic feet per minute) at about 120° F. enters into the various distribution box supply conduits 61, 62, 63 and 64. The rate of flow through conduits 61, 62, 63 and 64, respectively are: about 1,000 scfm; about 1,500 scfm, about 1,200 scfm, and finally, about 770 scfm. The temperature of the exhaust air through outlet 18 is roughly 658° F. and air exits at a rate of 4,500 scfm or about 20,250 lbs/hour. Sulfated limestone is introduced into inlet 16 at a rate of 5,000 pounds per hour at a temperature in the range of 1,200 to 1,800° F. but not in excess of 1,700° F. The temperature profile of the bed decreases toward outlet 22 where cooled solids are recovered at a temperature in the range of 200°–400° F. Water at 366° F. at 220 pound per square inch gauge ("psig") maximum enters heat exchange coil 25 and leaves at a temperature of 387° F. and 200 psig maximum. The rate of cooling water flow is in the vicinity of 200,000 pounds per hour.

Referring to FIGS. IV and V, there is disclosed a gas distribution assembly comprising a bolt 52, a lock washer 56, a castlenut 54 through a hole 50 in the flat top of a distribution box 34 (FIG. II). In a preferred embodiment two sides of bolt 52 along the threads have been either sheared or machined off to yield smooth shaved surfaces 58 which are flat and preferably at right angles to one another. Hole 50 is so sized to permit the remaining threads of bolt 52 to be firmly gripped, and is notched on opposite sides of each hole 50 as shown in FIG. VI. In FIG. VI, there is shown a hole 50 having notches 49 on opposite sides of the hole. The notches need not necessarily be on opposite sides of the hole, but have been conveniently so provided in this instance. Notches 49 may be of any suitable shape, such as Vee shape, square cut or semi-circular.

The hole through castlenut 54 is one size larger than the thread size otherwise required by castlenut 52. Arrows 45 and 46 show the path of air through notched hole 50 from within distribution box 34 into the bed cooler.

Of particular importance to the instant invention is the path of air along a horizontal plane as the air passes out of castlenut 54, as indicated by arrows 46. The horizontal direction is determined by the path openings of castlenut 54. Lock washer 56 causes threads of bolt 52 to be in pressure contact with threads within hole 50 so as not to vibrate loose while in operation. The air flow path resulting from the apparatus combination disclosed herein reduces plugging because the solids are pushed away from the holes and channeling of gas in the fluid bed is reduced.

The bolt and castlenut combinations employed in this invention can be selected by one skilled in the art employing standard sizes disclosed by technical publications such as Machinery's Handbook, 21st Edition, Industrial Press Inc. or Standard Handbook of Fastening and Joining, McGraw-Hill, 1977. The nuts and bolts may be carbon steel or stainless steel. The top surface of the air boxes may be from about 10 gauge to one quarter inch thick steel. The bolts may be from about one half to about one and one half inch in length depending on the thickness of the air box top, the height of the sides of the castlenut and the thickness of the lock washer and from about one quarter to one half inch in diameter with about 13–20 threads to the inch. Bolt heads may be square, hexagonal, or screw head type such as phillips head. In the most preferred embodiment of the invention the bolts are modified by machining the threads off one or more sides of the bolt down to the root (head). When the bolts are modified to have two flat sides as shown in FIG. VI at least one flat side will be juxtaposition with at least one notch in the top of the air box. In FIG. VI both flat sides are in juxtaposition with both notches, and these elements cooperatively interact to provide a smooth flow path.

The element of device used to provide a flow path above the top of air box and below the bolt head and lock washer is one which permits gas flow through its lower portion. A castlenut or slotted nut is preferred because it provides openings around its bottom from the hole to the outer edges. Other nuts, sleeves or hollow spacers can be formed, machined or modified to provide such openings preferably sawtooth, slotted or arch shaped having a height of one tenth inch to one quarter inch through the bottom. The device may have from 20 to 80 volume percent (preferably 40 to 60 vol. %) open space in the lower portion, usually the lower half. The conventional castlenut has six arch shape openings which may be squared or rounded at the top of the arch. This arrangement can provide for as many as six radial streams of gas eminating from the bottom of the nut. The castlenuts, in cooperation with the other elements of the invention reduce plugging of the air distribution system.

The castlenuts are so effective that it is possible to use them in conjunction with notched holes in the plates and with bolts that have not been machined to remove thread material. Also the castlenut may be used with the arch portions up.

Specific compositions, methods, devices, equipment or embodiments discussed herein are intended to be only illustrations of the invention disclosed by this specification. Variation on these compositions, methods, devices, equipment or embodiments will be readily apparent to a person of skill in the art based upon the teachings of this specification and are therefore intended to be included as part of the inventions disclosed herein.

I claim:

1. In a distribution system for fluidizing gas comprising threaded holes through plates wherein there is a pressure drop through at least a portion of such holes of at least 15 inches of a column of water, the improvement which comprises: restricting gas passage through said holes by means of a threaded bolt wherein in cooperation with said bolt there is a means for imposing a horizontal flow path as said fluidizing gas exits through said threaded holes, said means comprising nuts unthreaded spacers having opening in the bottom circumference comprising 10–80 vol. % of said means whereby a non-plugging distribution system for gas to a fluidized bed is achieved.

2. The improved distribution system for fluidizing gas of claim 1, wherein the means for imposing a horizontal flow consists of a castle nut in cooperation with said bolt.

3. The distribution system of claim 1 in which said gas is air.

4. The distribution system of claim 1 in which the pressure drop is in the range of 15–40 inches.

5. Apparatus according to claim 1 in which the solid particulates are spent limestone having a particle size in the range of 500–1500 microns.

6. Apparatus according to claim 1 in which at least a portion of the threads of said bolt have been removed.

7. Apparatus according to claim 1 in which the solid particulates are cooled from a temperature in the range of 1,200° F. to 1,800° F. to a temperature in the range of 200°–400° F.

8. Apparatus for passing a gas upwardly through a fluid bed of solid particulates comprising, in combination:
A. at least one gas supply box directly beneath said bed, the top surface of said box containing a multiplicity of threaded holes spaced over said surface, each of said holes being notched at least one point on its circumference;
B. a gas distribution assembly comprising a castlenut, a lock washer and a threaded bolt, wherein at least a portion of the threads of said bolt are engaged with at least a portion of said threaded holes, except where notched; and
C. the shaft of said bolt having been machined to remove the threads along at least one side of said shaft, providing a smooth portion; and whereby said gas traverses the top surface of the box via the smooth portion of the bolt, the notches in said holes and the openings in said castlenut.

9. Apparatus according to claim 8 in which the solid particulates are spent limestone having a particle size in the range of 500–1,500 microns.

10. Apparatus according to claim 8 in which the solid particulates are cooled with air from a temperature in the range of 1,200° to 1,800° F. to a temperature in the range of 200° to 400° F.

11. Apparatus according to claim 8 in which each threaded hole in the top of said box is notched at two points on the circumference and the shaft of the bolt is machined smooth on two sides at an angle of about 90 degrees to one another, whereby a portion of a smooth side of said bolt cooperatively interacts with a portion of a notch to form a flow path.

12. Apparatus according to claim 8 in which in castlenut has from 40–60 volume percent open space in its lower half.

* * * * *